United States Patent
Brown

(10) Patent No.: US 11,215,959 B2
(45) Date of Patent: Jan. 4, 2022

(54) FIELD DEVICE WITH HIGH SPEED COMMUNICATION

(71) Applicant: Schneider Electric USA, Inc., Andover, MA (US)

(72) Inventor: Larry K. Brown, Bellingham, MA (US)

(73) Assignee: Schneider Electric USA, Inc., Boston, MA (US)

(*) Notice: Subject to any disclaimer, the term of this patent is extended or adjusted under 35 U.S.C. 154(b) by 127 days.

(21) Appl. No.: 16/710,241

(22) Filed: Dec. 11, 2019

(65) Prior Publication Data

US 2021/0181702 A1 Jun. 17, 2021

(51) Int. Cl.
*G05B 19/042* (2006.01)
*G05B 19/418* (2006.01)

(52) U.S. Cl.
CPC ..... *G05B 19/0425* (2013.01); *G05B 19/4185* (2013.01); *G05B 2219/25014* (2013.01); *G05B 2219/25428* (2013.01); *G05B 2219/31121* (2013.01); *G05B 2219/31135* (2013.01); *G05B 2219/31145* (2013.01); *G05B 2219/33331* (2013.01)

(58) Field of Classification Search
CPC ......... B66F 17/00; H04Q 9/00; H04L 63/123; H04L 9/0643; H04L 63/0807; H04L 9/088; G05B 19/058; G05B 819/048; G05B 219/2619; G05B 19/042; G06Q 50/06; G06F 21/606
See application file for complete search history.

(56) References Cited

U.S. PATENT DOCUMENTS

| | | |
|---|---|---|
| 5,970,430 A | 10/1999 | Burns et al. |
| 6,014,612 A | 1/2000 | Larson et al. |
| 6,026,352 A | 2/2000 | Burns et al. |
| 6,037,857 A * | 3/2000 | Behrens ............. G05B 19/0423 375/257 |
| 6,044,305 A | 3/2000 | Larson et al. |
| 6,047,222 A | 4/2000 | Burns et al. |

(Continued)

OTHER PUBLICATIONS

Field Bus Standard for Use in Industrial Control Systems, Part 2: Physical Layer Specification and Service Definitions, ISA-d50.2; ISA/SP50-1992-236P; Partial Copy, Chapters 11 & 13 Omitted; Jul. 1992.

(Continued)

*Primary Examiner* — Kidest Bahta
(74) *Attorney, Agent, or Firm* — Locke Lord LLP

(57) ABSTRACT

A system is provided to conduct communication in a facility with equipment in hazardous and safe areas. The system includes at least one field device in a hazardous area of the facility; one or more controllers, located in a safe area of the facility, for managing the at least one field device; and a field barrier, between the safe and hazardous areas, to limit at least electrical energy, which is supplied to the at least one device, at or below an electrical energy threshold in the hazardous area. The system also includes a bus system to supply electrical energy across the field barrier to the at least one field device using electrical wiring and to enable communication between the at least one field device and the one or more controllers across the field barrier using one or more fiber optic cables.

20 Claims, 7 Drawing Sheets

(56) References Cited

U.S. PATENT DOCUMENTS

| | | | |
|---|---|---|---|
| 6,088,665 | A | 7/2000 | Burns et al. |
| 6,192,281 | B1 | 2/2001 | Brown et al. |
| 6,285,966 | B1 | 9/2001 | Brown et al. |
| 6,377,859 | B1 | 4/2002 | Brown et al. |
| 6,382,226 | B1 | 5/2002 | Larson et al. |
| 6,850,973 | B1 | 2/2005 | Larson et al. |
| 6,959,356 | B2 | 10/2005 | Packwood et al. |
| 7,580,992 | B2 | 8/2009 | Eisenbeis et al. |
| 9,258,535 | B2 | 2/2016 | Pool |
| 2002/0002426 | A1* | 1/2002 | Burkhard ................ E21B 44/00 700/286 |
| 2005/0001652 | A1* | 1/2005 | Malik ..................... H04Q 9/00 326/38 |
| 2014/0232517 | A1* | 8/2014 | Dantas .................... G05B 9/05 340/3.1 |
| 2018/0101156 | A1* | 4/2018 | Kumar KN ............ H02H 9/008 |
| 2018/0283171 | A1* | 10/2018 | Bhongale ................ E21B 47/07 |

OTHER PUBLICATIONS

Jordan J R et al: "A fibre optically extended field bus", Measurement Science and Technology, IOP, Bristol, GB, vol. 3, No. 9, Sep. 1, 1992 (Sep. 1, 1992), pp. 902-908, XP020065303,ISSN: 0957-0233, DOI 10.1088/0957-0233/3/9/017.

Shoshani G et al: "Industrial Fieldbus technology and Fieldbus cable overview—Cable standards and electrical qualifications", Petroleum and Chemical Industry Conference (PCIC), 2010 Record of Conference Papers Industry Applications Society 57th Annual, IEEE, Piscataway, NJ, USA, Sep. 20, 2010 (Sep. 20, 2010), pp. 1-10, XP031834697, ISBN: 978-1-4244-6800-3.

Extended European Search Report dated May 11, 2021 for related EP Patent Application No. EP20211259.5, 10 pages.

\* cited by examiner

FIELD DEVICE WITH HIGH SPEED COMMUNICATION

TECHNICAL FIELD

The present disclosure relates to communications in a process control network such as in an industrial processing facility, and more particularly, a process control network utilizing a fiber optic communication infrastructure for safe, reliable, high-speed communication in hazardous environments.

BACKGROUND

Some industrial facilities may employ process control and automation systems to automate large and complex industrial (or manufacturing) processes. Such systems can employ equipment in a control room to perform control and input/output (I/O) functions over equipment out in the field. The control room equipment may gather input/output information from the field, and can perform various control functions and transmit outputs back to the field.

Industrial processes may be implemented in an environment where ignitable hazardous gases may build. Protection techniques, for example intrinsic safety (IS) or other isolation approaches, may be implemented in such facilities to limit the electrical and/or thermal energy available for ignition, in order to provide for safe operation of electrical equipment in hazardous environments. For example, an intrinsically safe barrier can be used to limit energy and isolate important input/output operations between the control room and the field. Intrinsically safe equipment can also be equipment and wiring which is incapable of releasing sufficient electrical or thermal energy under normal or abnormal conditions to cause ignition of a specific hazardous atmospheric mixture in its most easily ignited concentration.

SUMMARY

A system and method are provided to conduct communication in a facility with equipment in hazardous and safe areas. The system includes at least one field device in a hazardous area of the facility; one or more controllers, located in a safe area of the facility, for managing the at least one field device; and a field barrier, between the safe and hazardous areas, to limit at least electrical energy, which is supplied to the at least one device, at or below an electrical energy threshold in the hazardous area. The system also includes a bus system to supply electrical energy across the field barrier to the at least one field device using electrical wiring and to enable communication between the at least one field device and the one or more controllers across the field barrier using one or more fiber optic cables. Communication between the at least one field device and the one or more controllers can be Ethernet communications.

In some embodiments, the energy usage in the hazardous area can be intrinsically safe (IS) or can satisfy fieldbus intrinsically safe concept (FISCO). The electrical energy threshold can correspond to one or more operating constraints for the facility to prevent ignition of gases in the hazardous area of the facility.

In an embodiment, the field device can include a transmitter with a local light source and a drive circuit. The local light source can generate light for fiber optic communication, and can be operated using electrical energy which is at or below the energy threshold. The drive circuit can directly or indirectly control the local light source to generate a light signal corresponding to data for transmission across the one or more fiber optic cables.

In another embodiment, the system can include an external light source for generating light, which is supplied to the field device across the field barrier using a first optical fiber from the one or more fiber optic communication cables. The at least one field device can include an optical switch and a drive circuit. The optical switch can modulate and transmit the light from the external light source to conduct communication over a second optical fiber from the one or more fiber optic communication cables. The drive circuit can control the optical switch to modulate the light from the external light source for transmission.

The one or more fiber optic communication cables can include a first optical fiber for conducting communication from the at least one field device to the one or more controllers; and a second optical fiber for conducting communication from the one or more controllers to the at least one field device. The at least one field device can be a sensor, an actuator or a valve.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
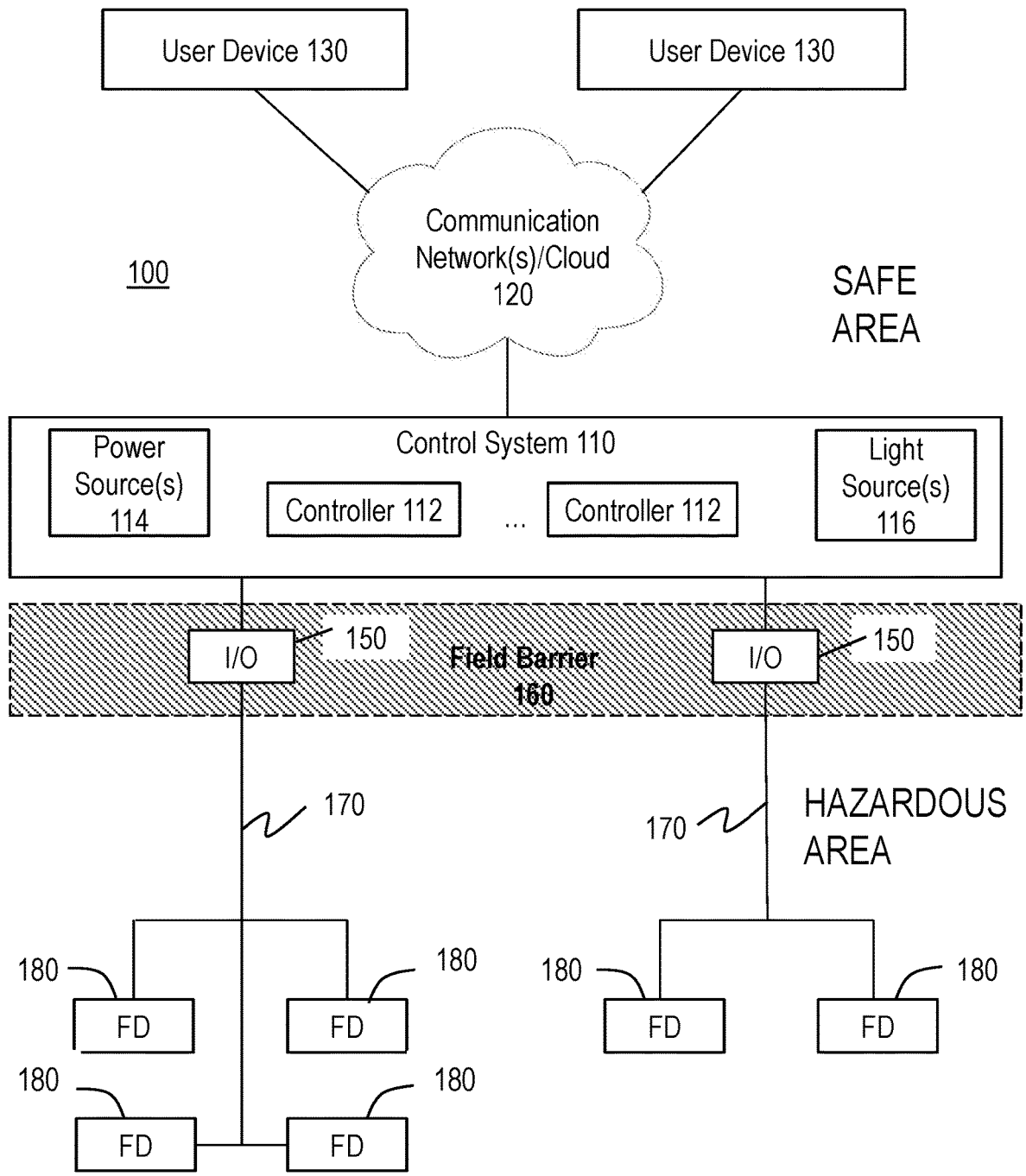
FIG. 1 is a block diagram illustrating an example process control network in accordance with an embodiment.

The present disclosure is directed to improvements to communication in process control networks, which employ protection techniques such as a field barrier to limit energy and isolate important input/output operations between equipment in safe and hazardous areas (or zones) of a facility. A hazardous area can refer to an area with combustible material (e.g., gases, dusts or fibers) that may produce an ignitable mixture (or gases). The process control networks can include one or more controllers in a safe area such as a control room, which can manage, control or monitor field devices and other equipment in a hazardous area across a field barrier. Instead of employing an electrical bus infrastructure to provide for power and communication and to control energy levels, the power source can be separated from the communications link in a field device by utilizing fiber optics to conduct communication, for example, between the controllers or other equipment in the safe areas and the field devices in the hazardous areas. A fiber optic communication infrastructure (e.g., fiber optic cables) can provide a number of advantages over metal communication cables, such as higher transmission bandwidth, data rate and data amount, lower power loss over distance, higher security, immunity to electromagnetic interference or other noise, lesser space requirements, dielectric properties (e.g., no spark hazards), corrosion resistance, lower costs, longer durability, and so forth. In this way, the process control networks can maintain intrinsically safe (IS) power standards without having to exceed energy limitations or sacrifice protection, and can increase communication performance and reliability while enabling the use of the same wired distance as existing field device technologies. Such an approach can also provide additional communications bandwidth to support IIoT (Industrial Internet of Things), and allow faster control loops using digital communications.

Furthermore, an external light source for fiber optic communication can be used to minimize power consumption in the field device to further ensure that intrinsic safety thresholds are not exceeded. For example, a light source(s), which is used for fiber optic communication, can be generated in a safe area and transmitted to the field device for use in conducting fiber optic communication. In this way, by using a remote light source for the fiber optic communication, the power to drive the light source (e.g., LED or other light source) locally is reduced by using an optical switch (or gate) to perform the bit transitions for digital communications. By using a remote light source(s) from the safe area, the heat generated by the light used at the field device is also reduced to again improve intrinsic safety.

Accordingly, the use of fiber optics can significantly enhance communications in process control networks which implement safety measures such as IS (Intrinsic Safety), FISCO (Fieldbus Intrinsically Safe Concept), or other protection techniques. FISCO configuration can, for example, limit energy to 115 mA at 9V, or less. It is also possible to enhance communications through fiber optics in a similar manner so that other industry standards such, as for example, PROFINET (Portmanteau for Process Field Net), OPC UA (Open Platform Communications Unified Architecture), MQTT (MQ Telemetry Transport), ODVA (Open DeviceNet Vendor Association) or other standard may be implemented in an intrinsically safe manner. A more detailed description of example systems and methods of the present application are described below with reference to the figures.

FIG. 1 illustrates an example of a process control network 100 in a facility with equipment in safe areas and hazardous areas, which interact with each other. For example, the safe areas can include a control room, and the hazardous areas can include processing or other equipment. The process control network 100 can include a control system 110 that has one or more controllers 112, power source(s) 114 and light source(s) 116, which are located in a safe area(s) of the facility. The process control network 100 can also include one or more field devices (or instruments) 180 in a hazardous area(s) of the facility. The process control network 100 can also include user devices 130 (e.g., computer, smartphone, etc.), which can interact with the control system 110 across communication network(s) 120, to control, manage or request/obtain information relating to the field devices 180 and the processing equipment in the hazardous area. For example, a user can interact with or remotely control the control system 110 and its operations through cloud-based services using the user device 130 via the Internet (e.g., IIoT).

For safety, the process control network 100 can employ a field barrier(s) 160 between the equipment in the safe and hazardous areas to isolate and limit energy, such as electrical and/or heat energy, to conform with safety standards such as IS or FISCO. As shown in this example, the field barrier 160 can isolate the control system 110 and its components in the safe area(s) from the field devices 180 and other processing equipment in the hazardous area(s). A bus system 170 is provided to supply power to the field devices 180 from the power source(s) 114 of the control system 110, and to enable communication between the field devices 180 and the controllers 112 of the control system 110, across the field barrier 160. To enhance communication while maintaining safety standards in the facility (e.g., an industrial processing facility), the bus system 170 can employ electrical wiring (e.g., electrical lines or conductors) to supply power to equipment in the hazardous area(s) across the field barrier 160, and fiber optic cable(s) for conducting reliable, high-speed, digital communication between equipment in the safe areas and equipment in the hazardous areas and/or between equipment in the hazardous areas.

The controller(s) 112 can be a computer system or device, such as a computer, server, industrial controller, industrial server, programmable logic controller (PLC), distributed control system (DCS), programmable automation controller (PAC) or other computer system to control, manage and/or monitor other equipment. The controller 112 can be configured to manage, control, monitor and/or obtain information (or data) from processing equipment including the field devices in the hazardous area(s), as well as other devices and systems in the facility.

The field device(s) 180 can be a sensor, valve, actuator and/or other field device (or instrumentation) such as in industrial processing facilities. In various embodiments, the field device 180 can transmit information (or data) back to the controller(s) 112 over the bus system 170, and the controller(s) 112 can use the information to control or adjust the operations of the processing equipment in the hazardous areas via instructions or commands transmitted over the bus system 170. For example, the controller(s) 112 can control the operations of actuators, valves and/or other devices to control or adjust the operations of the processing equipment.

The field barrier 160 can include input/output (I/O) modules 150 to isolate or restrict energy (e.g., electrical energy) available to the field devices 180 and other equipment in the hazardous area(s) through the bus system 170 according to IS or FISCO standards. The equipment in the process control network 100, such as the field devices 180 and other equipment in the hazardous areas, can also be configured to operate according to IS or FISCO standards.

The bus system 170 can include electrical wiring (e.g., electrical lines or conductors) to supply power to the field devices across the field barrier 160, and fiber optic cable(s) for conducting reliable, high-speed digital communication between equipment in the safe areas, such as the controllers 112, and equipment in the hazardous areas, such as the field devices 180. As used herein, a fiber optic cable refers to one or more optical fibers or fiber optic lines. An external light source(s) 116 can be provided in the safe area(s) to generate and transmit a steady stream of light to the field devices 180 for use in conducting fiber optic communication in order to minimize electrical and heat energy at the field devices 180. The bus system 170 (and other equipment associated with fiber optic communication) can include additional elements such as fiber and cable splicers and connectors, regenerators, beam splitters, and optical amplifiers to improve the performance of the communication system in the process control network 100. In various embodiments, the electrical wiring can also be used to conduct communications as the primary or secondary communication infrastructure versus the fiber optic communication infrastructure provided by the fiber optic cables. For example, either electrical wiring or the fiber optic cables can be used as a backup communication in the event that the primary communication is unavailable.

Figure 2:
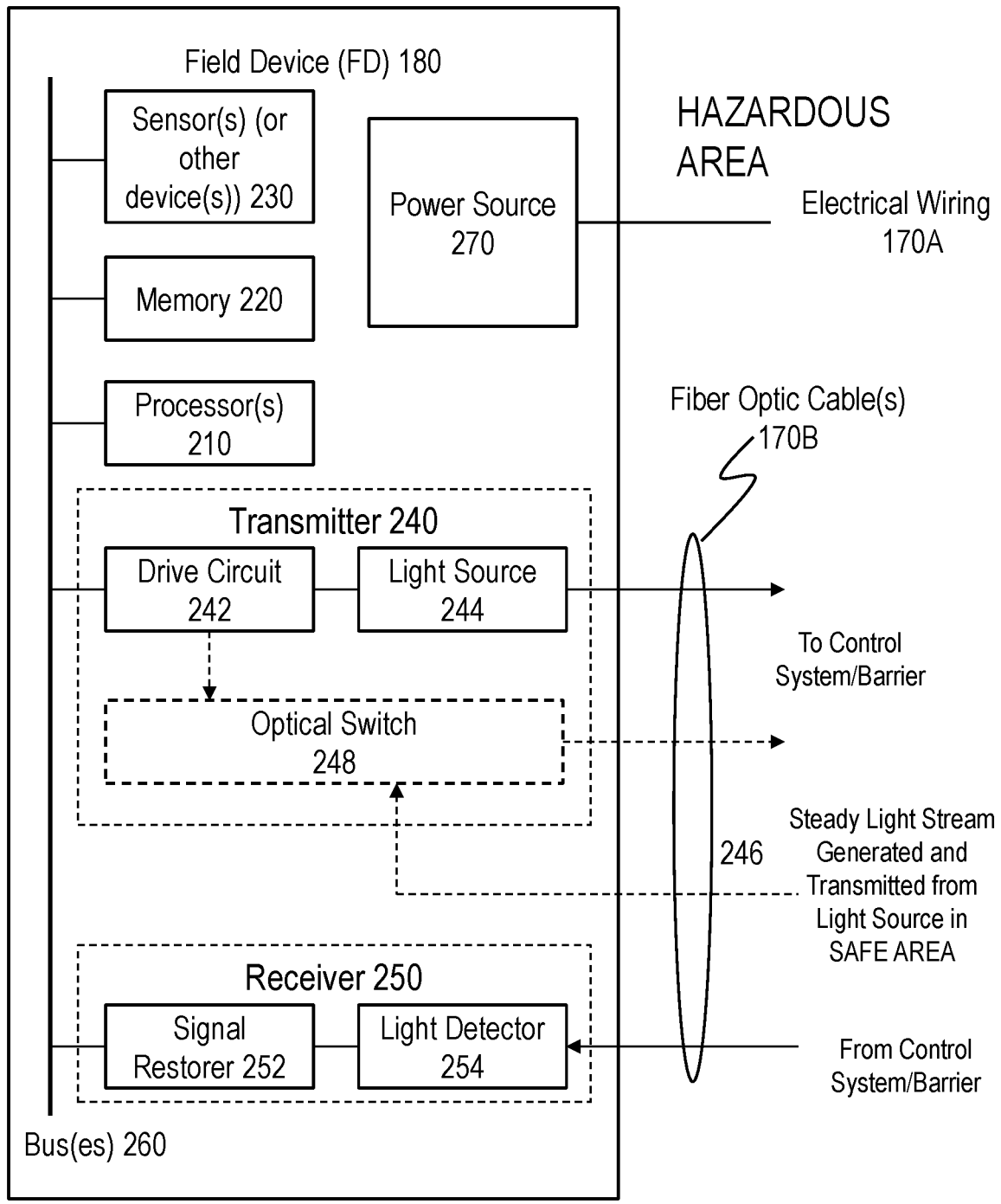
FIG. 2 is a block diagram illustrating an example of a field device in a process control network, such as in FIG. 1, in accordance with an embodiment.

FIG. 2 is a block diagram illustrating example components of a field device 180, such as for example in the process control network 100 of FIG. 1. As shown in FIG. 2, the field device 180 can include one or more processors 210 to control the operations and components of the field device 180. The field device 180 can further include memory 220, sensor(s) or other device 230, transmitter 240, receiver 250 and bus(es) 260 interconnecting the components of the field device 180. The field device 180 can also include a power source 270, which can be local or can receive power across electrical wiring (e.g., electrical conductor(s) or line(s)) 170A of the bus system 170 in FIG. 1 in an intrinsically safe manner.

The sensor(s) or other device(s) 230 can take the form of one or more sensors (e.g., pressure sensor, voltage sensor, current sensor, temperature, or other sensor for sensing an environment or processing equipment in the hazardous area), one or more actuators, one or more valves, and/or other forms of instrumentation in an industrial processing facility.

The transmitter 240 can be a light signal transmitter for outputting light signals onto a fiber optic cable 170B of the bus system 170, In one embodiment, the transmitter 240 can include a drive circuit 242 and a light source 244 (e.g., a local light source such as a LED(s)). The drive circuit 242 can receive data in the form of electrical or other signal to be transmitted. The light source 244 can be driven directly or indirectly by the drive circuit 242 to output modulated light signals (e.g., digital data bits), which correspond to information (e.g., data, commands or instructions, etc.), onto the fiber optic cable 170B in order to communicate with other field devices 180 or equipment in the safe area(s) such as the controllers 112 across the field barrier 160. In another embodiment, the transmitter 240 can include an optical switch 248, which receives a steady light stream from a light source(s) in a safe area via a fiber optic cable 170B (as shown by reference 246). The steady light stream can be modulated using the optical switch 248, as driven by the drive circuit 242, to output modulated light signals (e.g., digital data bits), which correspond to information (e.g., sensor data, commands or instructions, etc.), onto the fiber optic cable 170B in order to communicate with other field devices 180 or equipment in the safe area(s) such as the controllers 112 across the field barrier 160.

The receiver 250 can be a light signal receiver, which can include a signal restorer 252 and a light detector 254. The light detector 254 can receive and detect light signals from the fiber optic cable 170B, which may originate from other field devices 180 or from equipment in the safe area(s) such as the controllers 112. The signal restorer 252 can convert the light signals, which correspond to information, into electrical or other signals, which can be processed by the processor 210 (or other components of the field device 180). The information can include commands or instructions from the controllers 112, or information from other field devices 180 for use by the field device 180 or to be passed along to another field device 180 of the controllers 112.

Although the field device 180 in FIG. 2 shows a transmitter and receiver for conducting fiber optic communication, the field device 180 may also include a transmitter/receiver for conducting communication across electrical conductors, such as the electrical wiring (e.g., conductors or electrical lines or wires) of the bus system 170.

Figure 3:
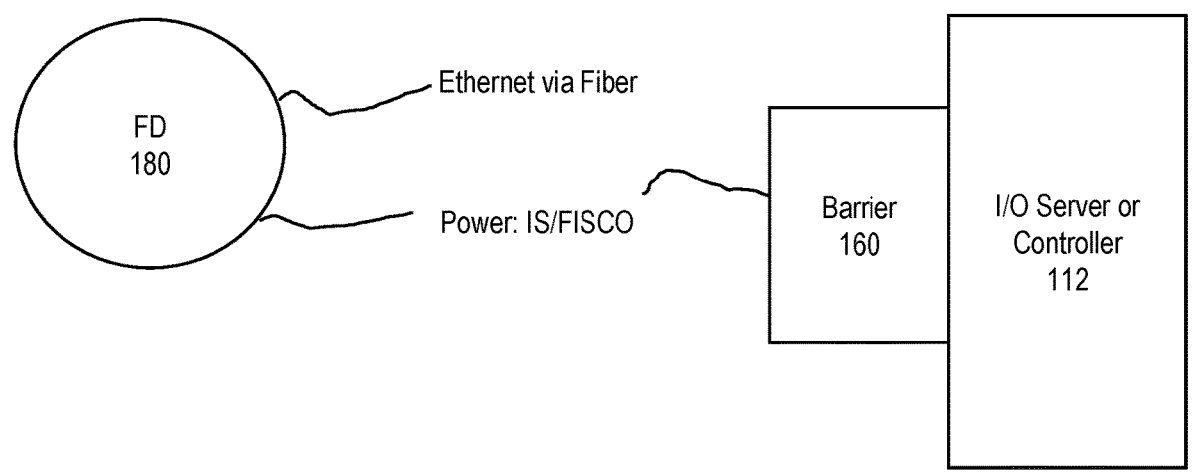
FIG. 3 is a block diagram illustrating a high level system view of an example configuration in which a field device in a hazardous area can conduct fiber optic communication with a controller in a safe area, across a field barrier.
Figure 4:
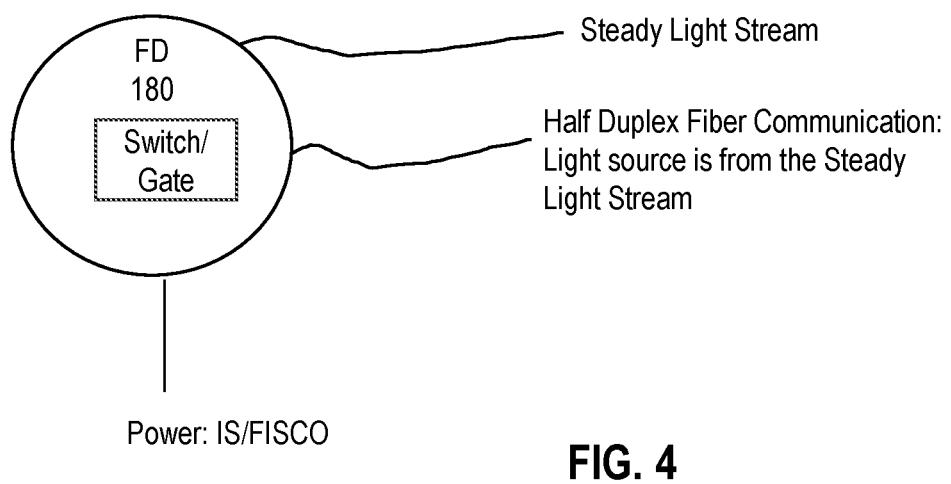
FIG. 4 is a block diagram illustrating one example of a half-duplex communication configuration in the system of FIG. 3 using fiber optics to conduct communication, in accordance with an embodiment.
Figure 5:
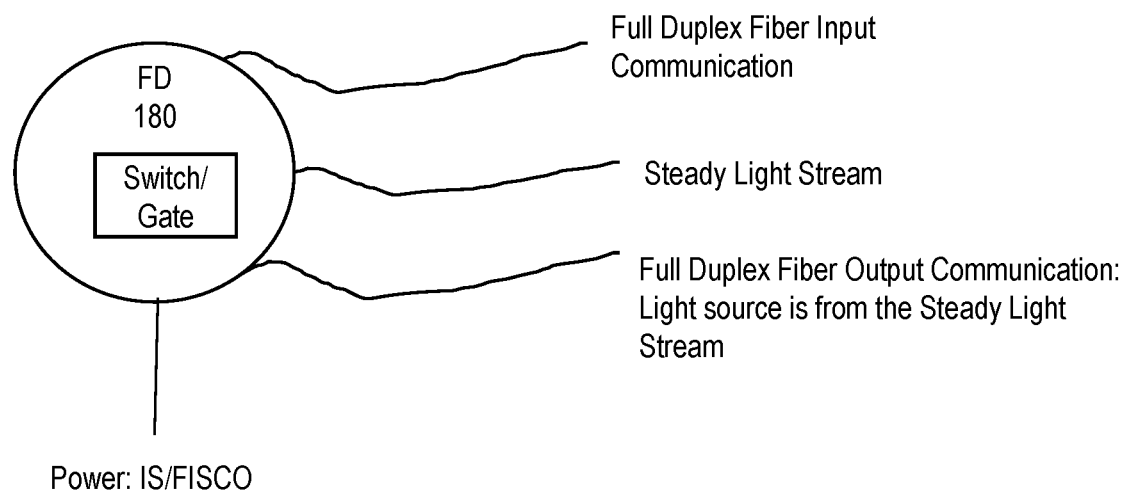
FIG. 5 is a block diagram illustrating another example of a full-duplex communication configuration in the system of FIG. 3 using fiber optics to conduct communication, in accordance with another embodiment.

FIG. 3 is a block diagram 300 illustrating a high level system view of an example configuration in which a field device 180 in a hazardous area can conduct fiber optic communication with a controller 112 or other equipment in a safe area, across a field barrier 160. As shown in FIG. 3, the field device 180 and the controller 112 can conduct Ethernet communication or use other communication protocols to conduct communication across fiber optic cable(s). In this example, power is supplied and regulated in a manner, which can satisfy IS or FISCO standards. FIGS. 4 and 5 show different embodiments of the communication configuration in FIG. 3. For example, as shown in FIG. 4, a half-duplex communication configuration can be provided in the system of FIG. 3 using fiber optics to conduct communication across the field barrier. As shown in FIG. 5, a full-duplex communication configuration can be provided in the system of FIG. 3 using fiber optics to conduct communication across the field barrier. The communication configuration can satisfy Safety Integrity Level (SIL) certification for industrial plant applications. Such a configuration can involve starting with a sensor TAG value with cyclic redundancy check (CRC), providing a Black Channel, sending out two separate copies with CRC to receiving nodes, providing a final control element with responsibility to process both messages for consistency, and feasibly performing at 10 Megabit rate).

Figure 6:
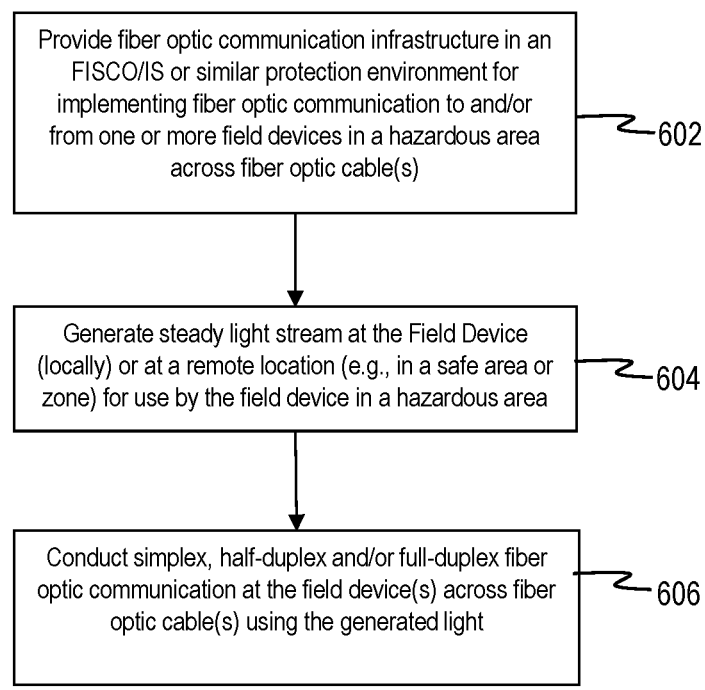
FIG. 6 is an example process by which a field device in a hazardous area can conduct fiber optic communication with a controller or other equipment in a safe area across a field barrier.

FIG. 6 is an example process 600 by which a field device (e.g., 180 in FIG. 1) in a hazardous area can conduct fiber optic communication with a controller (e.g., 112 in FIG. 1) or other equipment in a safe area across a field barrier.

At reference 602, a fiber optic communication infrastructure is provided in an FISCO/IS or similar protection environment for implementing fiber optic communication to and/or from one or more field devices in a hazardous area across a fiber optic cable(s).

At reference 604, a steady light stream is generated locally at the field device or at a remote location, such as in a safe area, for use by the field device in a hazardous area. For example, the field device can use a local light source (e.g., LED(s)) to generate or output light, which is modulated to produce a light signal corresponding to information (or data) for transmission across a fiber optical cable. Alternatively, the field device can receive a steady light stream generated by an external light source (e.g., LED(s)) in a safe area, and modulate the received light (e.g., using an optical switch (or gate)) to produce a light signal corresponding to information (or data) for transmission across a fiber optical cable.

At reference 606, the field device can conduct simplex, half-duplex and/or full-duplex fiber optic communication with a controller(s) or other equipment in a safe area(s)

across the field barrier or with another field device or other equipment in a hazardous area(s).

Although the process 600 is described with reference to a field device in a hazardous area, other equipment in a hazardous area of a processing facility can likewise conduct fiber optic communication in a similar fashion in compliance with IS or FISCO standards.

Figure 7:
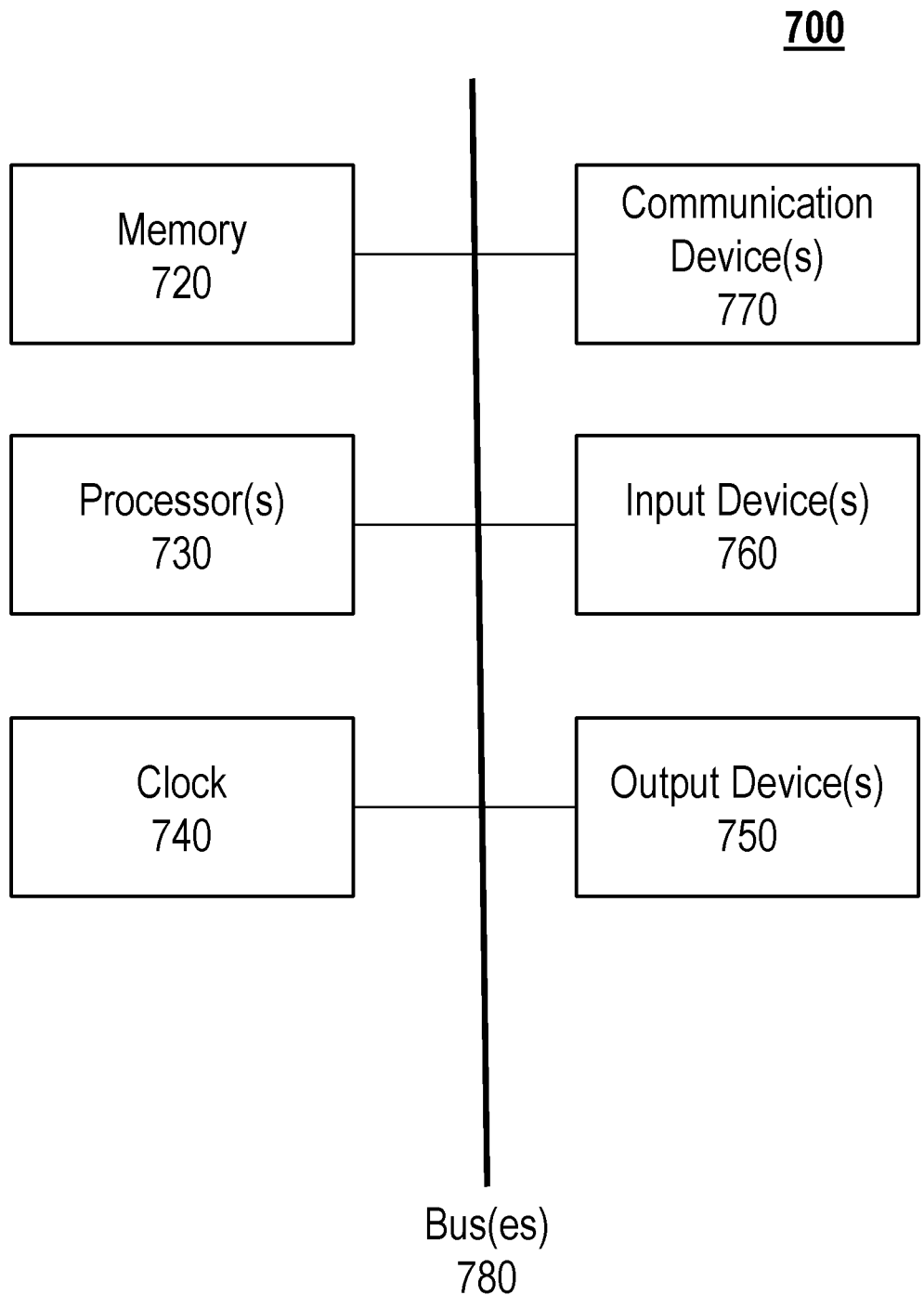
FIG. 7 shows an example of a computer device (or system) in accordance with an embodiment of the present disclosure.

FIG. 7 is a block diagram of example components of a computer device (or system) 800, in accordance with an exemplary embodiment of the present disclosure. As shown in FIG. 7, a computer device 700 can include for example memory 720, processor(s) 730, clock 740, output device 750, input device 760, communication device 770, and a bus system 780 between the components of the computer device. The clock 740 can be used to time-stamp data or an event with a time value, and synchronize operations within the device and with remote devices. The communication device 770 can include transmitters and receivers for conducting wireless communications or wireline communications across electrical wires (e.g., conductors) and/or fiber optic cables. For example, the communication device 770 can include light signal transmitters/receivers for conducting fiber optic communication.

The memory 720 can store computer executable code, programs, software or instructions, which when executed by a processor, controls the operations of the computer device 700, including the various processes described herein. The memory 720 can also store other data used by the computer device 700 or components thereof to perform the operations described herein. The other data can include but is not limited to thresholds or conditions for reports and alarms, locations and address of field devices and other data described herein.

The output device(s) 750 can include a display device, printing device, speaker, lights (e.g., LEDs) and so forth. For example, the output device(s) 750 may output for display or present information regarding the process under control and information from or associated with the one or more field devices in one or more viewers, graphical user interface (GUI) or other data.

The input device(s) 760 can include any user input device such as a mouse, trackball, microphone, touch screen, a joystick, control console, keyboard/pad, touch screen or other device operable by a user.

The processor(s) 730, which interacts with the other components of the computer device, is configured to control or implement the various operations described herein. These operations can include controlling, managing and/or monitoring process control equipment (including the field devices) as described herein, or other operations described herein.

The above describes example components of a computer device. The computer device may or may not include all of the components of FIG. 7, and may include other additional components to facilitate operation of the processes and features described herein. The computer device may be a distributed processing system, which includes a plurality of computer devices which can operate to perform the various processes and features described herein.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

I claim:

1. A system for conducting communication in a facility with equipment in hazardous and safe areas, comprising:
   at least one field device in a hazardous area of the facility;
   one or more controllers, located in a safe area of the facility, for managing the at least one field device;
   a field barrier, between the safe and hazardous areas, to limit at least electrical energy, which is supplied to the at least one field device, at or below an electrical energy threshold in the hazardous area; and
   a bus system to supply electrical energy across the field barrier to the at least one field device using electrical wiring and to enable communication between the at least one field device and the one or more controllers across the field barrier using one or more fiber optic cables, the at least one field device being configured to perform fiber optic communication across the one or more fiber optic cables of the bus system.

2. The system of claim 1, wherein energy usage in the hazardous area is intrinsically safe (IS) or satisfies fieldbus intrinsically safe concept (FISCO).

3. The system of claim 1, wherein the field device includes a transmitter comprising:
   a local light source to generate light for fiber optic communication, the local light source being operated using electrical energy which is at or below the energy threshold; and
   a drive circuit for controlling the local light source to generate a light signal corresponding to data for transmission across the one or more fiber optic cables.

4. The system of claim 1, further comprising:
   an external light source for generating light, which is supplied to the field device across the field barrier using a first optical fiber from the one or more fiber optic communication cables,
   wherein the at least one field device includes:
      an optical switch for modulating and transmitting the light from the external light source to conduct communication over a second optical fiber from the one or more fiber optic communication cables; and
      a drive circuit for controlling the optical switch to modulate the light from the external light source for transmission.

5. The system of claim 1, wherein the one or more fiber optic communication cables includes:
   a first optical fiber for conducting communication from the at least one field device to the one or more controllers; and
   a second optical fiber for conducting communication from the one or more controllers to the at least one field device.

6. The system of claim 1, wherein the at least one field device comprises a sensor, an actuator or a valve.

7. The system of claim 1, wherein communication between the at least one field device and the one or more controllers comprises Ethernet communications.

8. The system of claim 1, wherein the electrical energy threshold corresponds to one or more operating constraints for the facility to prevent ignition of gases in the hazardous area of the facility.

9. A method of conducting communication in a facility with equipment in hazardous and safe areas, comprising:
   providing at least one field device in a hazardous area of the facility;
   managing the at least one field device using one or more controllers located in a safe area of the facility;
   limiting electrical energy, which is supplied to the at least one field device, at or below an electrical energy threshold in the hazardous area using a field barrier, between the safe and hazardous areas; and
   supplying electrical energy across the field barrier to the at least one field device using electrical wiring of a bus system and enabling communication between the at least one field device and the one or more controllers across the field barrier using one or more fiber optic cables of the bus system, the at least one field device being configured to perform fiber optic communication across the one or more fiber optic cables of the bus system.

10. The method of claim 9, wherein energy usage in the hazardous area is intrinsically safe (IS) or satisfies fieldbus intrinsically safe concept (FISCO).

11. The method of claim 9, further comprising:
    conducting communication at the field device by:
       generating light for fiber optic communication using a local light source, the local light source being operated using electrical energy which is at or below the energy threshold; and
       controlling the local light source to generate a light signal corresponding to data for transmission across the one or more fiber optic cables.

12. The method of claim 9, further comprising:
    generating light using an external light source, the light being supplied to the field device across the field barrier using a first optical fiber from the one or more fiber optic communication cables; and
    conducting communication at the field device by modulating and transmitting the light from the external light source to conduct communication over a second optical fiber from the one or more fiber optic communication cables.

13. The method of claim 9, wherein the one or more fiber optic communication cables includes:
    a first optical fiber for conducting communication from the at least one field device to the one or more controllers; and
    a second optical fiber for conducting communication from the one or more controllers to the at least one field device.

14. The method of claim 9, wherein the at least one field device comprises a sensor, an actuator or a valve.

15. The method of claim 9, wherein communication between the at least one field device and the one or more controllers comprises Ethernet communications.

16. The method of claim 9, wherein the electrical energy threshold corresponds to one or more operating constraints for the facility to prevent ignition of gases in the hazardous area of the facility.

17. A tangible computer-readable medium storing computer executable code, which when executed by one or more processors, is configured to implement a method of conducting communication in a facility with equipment in hazardous and safe areas in which electrical energy, which is supplied to at least one field device, is limited at or below an electrical energy threshold in the hazardous area using a field barrier, between the safe and hazardous areas, the method comprising:

managing the at least one field device in the hazardous area of the facility from a safe area of the facility; and controlling supply of electrical energy across the field barrier to the at least one field device using electrical wiring of a bus system and controlling communication between the at least one field device and the one or more controllers across the field barrier over one or more fiber optic cables of the bus system, the at least one field device being configured to perform fiber optic communication across the one or more fiber optic cables of the bus system.

18. The tangible computer-readable medium according to claim 17, wherein energy usage in the hazardous area is intrinsically safe (IS) or satisfies fieldbus intrinsically safe concept (FISCO).

19. The tangible computer-readable medium according to claim 17, wherein the method further comprises:

conducting communication at the field device by:

controlling generation of light for fiber optic communication using a local light source, the local light source being operated using electrical energy which is at or below the energy threshold; and controlling the local light source to generate a light signal corresponding to data for transmission across the one or more fiber optic cables.

20. The tangible computer-readable medium according to claim 17, wherein the method further comprises:

controlling generation of light using an external light source, the light being supplied to the field device across the field barrier using a first optical fiber from the one or more fiber optic communication cables; and conducting communication at the field device by modulating and transmitting the light from the external light source to conduct communication over a second optical fiber from the one or more fiber optic communication cables.

* * * * *